United States Patent [19]

Irmscher et al.

[11] 3,718,542

[45] Feb. 27, 1973

[54] INVERTED STEPS FOR THE PREPARATION OF 9α-FLUORO-16-METHYLENE-PREDNISOLONE OR-PREDNISONE AND 21-ESTERS THEREOF

[75] Inventors: Klaus Irmscher; Fritz Von Werder; Karl-Heinz Bork; Hans-Gunther Kraft, all of Darmstadt, Germany

[73] Assignee: Merck Patent Gesellschaft mit beschrankter Haftung, Darmstadt, Germany

[22] Filed: Aug. 20, 1969

[21] Appl. No.: 851,723

[52] U.S. Cl. ....195/51 E, 260/239.55 R, 260/397.45
[51] Int. Cl. ............................................C07c 169/32
[58] Field of Search ....../Machine Searched Steroids; 260/397.45

[56] References Cited

UNITED STATES PATENTS 3,257,386  6/1966  Djerassi et al. ..................260/239.55

*Primary Examiner*—Lewis Gotts
*Assistant Examiner*—Ethel G. Love
*Attorney*—I. William Millen

[57] ABSTRACT

A process having improved yields is provided for the production of 9α-fluoro-16-methylene-prednisone or prednisolone and 21-esters thereof, the key to the process being the order of steps as follows:

a. microbiologically dehydrogenating 9β,11β-oxido-16-methylene-4-pregnene-17α-ol-3,20-dione in the 1(2) position;

b. reacting the resultant 9β,11βoxido-16-methylene-1,4-pregnadiene-17α-0l-3,20-dione with hydrogen fluoride; and c. reacting the resultant 9α-fluoro-16-methylene-1,4-pregnadiene-11β,17α-diol-3,20-dione with iodine in an alkaline solution, and thereafter with an alkali metal acetate to form 9α-fluoro-16-methylene-prednisolone-21-acetate.

7 Claims, No Drawings

INVERTED STEPS FOR THE PREPARATION OF 9α-FLUORO-16-METHYLENE-PREDNISOLONE OR-PREDNISONE AND 21-ESTERS THEREOF

BACKGROUND OF THE INVENTION

This invention relates in general to steroids, and in particular to a process for the preparation of 9α-fluoro-16-methylene-steroids of the following Formula A

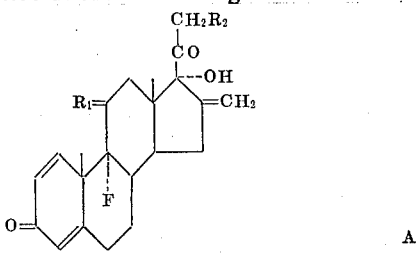

wherein $R_1$ represents αH, βOH or =O, and $R_2$ represents a free or esterified hydroxy group.

These compounds are known and possess interesting pharmacological properties, being especially useful for their anti-inflammatory activities. They can be produced in accordance with German Pat. No. 1,263,765 from 16-methylene-17α-hydroxy-progesterone (I) or the 1-dehydro-derivative thereof by means of 11-hydroxylation, and a number of secondary reactions. A particularly advantageous procedure, according to this German patent, resides in first converting compound I in four stages into 9β,11β-oxido-16-methylene-4-pregnen-17α-ol-3,20-dione (II); then acetoxylating the latter in the 21-position to 9β,11β-oxido-16-methylene-4-pregnene-17α,21-diol-3,20-dione-21-acetate (III); reacting (III) with hydrogen fluoride to obtain 9α-fluoro-16-methylene-hydrocortisone-21-acetate (IV); saponifying; microbiologically dehydrogenating in the 1(2)-position to 9α-fluoro-16-methylene-prednisolone (V); and optionally oxidizing this compound to the corresponding prednisone derivative and/or esterifying this compound V in the 21-position, for example to the particularly valuable 9α-fluoro-16-methylene-prednisolone-21-acetate (VI).

The yields were:

During the acetoxylation (II → III) 48%

During the cleavage with hydrogen fluoride (III → IV) 57%

During the saponification and subsequent 1-dehydrogenation (IV → V) 52%

(the intermediate 9α-fluoro-16-methylene-hydrocortisone obtained by means of the saponification is suitably not isolated)

and

During the acetylation (V → VI) 81%

Thus, based on II as the starting material, the total yield of VI was 11.5 percent.

SUMMARY OF THE INVENTION

The principal object of the invention is to provide an improved process for the production of steroids of Formula A, and especially to provide an improved process for the production of 9α-fluoro-16-methylene-prednisolone-21-acetate from 9β,11β-oxido-16-methylene-4-pregnene-17α-ol-3,20-dione.

Upon further study of the specification and claims, other objects and advantages of the present invention will become apparent.

To attain the objects of the invention, it was quite unexpectedly discovered, that compound VI can be produced from II in a total yield which is almost three times as high (32 percent), by first dehydrogenating II in the 1(2)-position, then reacting with hydrogen fluoride, and conducting the acetoxylation in the 21-position only at the end. From the acetate VI, it is possible to obtain, by oxidation and/or saponification, 9α-fluoro-16-methylene-prednisone-21-acetate or the corresponding 21-OH-compounds, and by esterification thereof, the corresponding 21-esters.

DETAILED DISCUSSION OF THE INVENTION

For the production of 9α-fluoro-16-methylene-prednisolone (V) or -prednisone, and 21-esters thereof, the process comprises the following order of steps:

a. microbiologically dehydrogenating 9β,11β-oxido-16-methylene-4-pregnen-17α-ol-3,20-dione (II) in the 1(2)-position;

b. reacting the thus-obtained 9β,11β-oxido-16-methylene-1,4-pregnadien-17α-ol-3,20-dione with hydrogen fluoride; and c. treating the thus-produced 9α-fluoro-16-methylene-1,4-pregnadiene-11β,17α-diol-3,20-dione with iodine in an alkaline solution and subsequently with an alkali metal acetate.

In the thus-obtained 9α-fluoro-16-methylene-prednisolone-21-acetate (VI) the 11-OH-group can be optionally converted into an 11-keto-group by treatment with an oxidizing agent and/or the 21-acetoxy-group can be optionally saponified by treatment with a saponifying agent with the formation of 9α-fluoro-16-methylene-prednisolone (V) or -prednisone, and finally, the latter compounds can be optionally converted into the 21-esters thereof by treatment with an esterification agent.

For the microbiological introduction of the 1(2)-positioned double bond, the following microorganisms are especially suitable: *Bacillus sphaericus, Fusarium solani, Corynebacterium simplex, Alternaria sp., Mycobacterium smegmatis, Calonectria decora, Mycobacterium lacticola, Ophiobolus sp., Alcaligenes sp., Didymella lycopersici, Protaminobacter sp., Septomyxa affinis, Nocardia sp., Cylindrocarpon radicicola, Streptomyces lavendulae, Bacillus cyclooxydans*. The fermentation requires about 4–14 hours, depending on the microorganism. Particularly suitable are cultures of *Bacillus sphaericus* var. *fusiformis* and *Corynebacterium simplex*.

By reacting the resultant 9β,11β-oxido-16-methylene-1,4-pregnadien-17α-ol-3,20-dione with hydrogen fluoride, preferably in a 75 percent aqueous hydrofluoric acid at −20° C., there is obtained 9α-fluoro-16-methylene-1,4-pregnadiene-11β,17α-diol-3,20-dione.

To introduce the 21-acetoxy-group, the last mentioned compound is treated in the usual manner with elemental iodine in an alkaline solution and subsequently with an alkali metal acetate, e.g. potassium acetate. Preferably, the elemental iodine is added to a solution of the steroid in a suitable inert organic solvent, for example a mixture of tetrahydrofuran and methanol, and the reaction solution is thereafter mixed dropwise with aqueous sodium hydroxide solution. The thus-obtained 21-iodo-compound is then converted, without isolation, into 9α-fluoro-16-methylene-prednisolone-21-acetate (VI) with potassium acetate, e.g. in acetone.

The thus-obtained compound VI or the 9α-fluoro-16-methylene-prednisolone (V) producible therefrom by saponification can be oxidized to the corresponding 11-keto-compounds. Suitable oxidizing agents include, but are not limited to a mixture of $CrO_3$ and pyridine or a mixture of $CrO_3$ and $H_2SO_4$ in water/acetone (Jones reagent) or hypohalous (hypochlorous or hypobromous) acid.

Alternatively, it is also possible to convert 9α-fluoro-16-methylene-prednisolone- or -prednisone-21-acetate, by treatment with a saponification agent, into 9α-fluoro-16-methylene-prednisolone or -prednisone. A suitable saponification agent is, for example, an aqueous solution of sodium bicarbonate. Advantageously, these reactions are conducted under the exclusion of oxygen.

Furthermore, 9α-fluoro-16-methylene-prednisolone or prednisone or the 21-acetates thereof, can be converted into any desired esters by esterification or ester interchange.

Suitable as esterification or interesterification agents are all those acids, or the derivatives thereof, effecting esterification or interesterification, which result in physiologically compatible esters. For example, the following acids or the derivatives thereof suitable for esterification can be employed: carboxylic acids of preferably one to 18 carbon atoms, e.g. fatty acids, such as acetic acid, propionic acid, butyric acid, valeric acid, isovaleric acid, trimethylacetic acid, caproic acid, enanthic acid, caprylic acid, palmitic acid, stearic acid, undecylenic acid, benzoic acid, hexahydrobenzoic acid, cyclopentyl-, cyclohexyl- or arylacetic acids and -propionic acids, such as phenylacetic or phenylpropionic acid, as well as halocarboxylic acids, such as chloroacetic acid, ether acids or heterocyclic acids, such as furancarboxylic acid-(2) or nicotinic acid. If desired, in order to produce water-soluble derivatives, it is also possible to esterify with dicarboxylic acids of preferably two to 18 carbon atoms, amino- or alkylamino-carboxylic acids, or with phosphoric or sulfuric acid. In this manner, the following compounds can be prepared, for example: oxalates, succinates, maleates, tetrahydrophthalates, or the acid addition salts of aminocarboxylic acid esters, such as, for example, aspartic acid esters, or diethyl-aminoacetic acid esters. Derivatives suitable for esterification are, in addition to the free acids, for example, the halogenides, anhydrides, thiol derivatives, as well as ketenes thereof. For inter-esterification methods, lower alkyl esters are likewise suitable.

The 16-methylene-corticoids obtained in accordance with the process of this invention can be employed as anti-inflammatory drugs. They are especially suitable for the treatment of rheumatoid arthritis and for combating persistent allergies and other inflammatory diseases of the skin. They are compounded in pharmaceutical compositions and administered in the same manner as the conventional corresponding 16-desmethylene steroids.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE a. Microbiological 1(2)-Dehydrogenation

A culture of *Corynebacterium simplex* is grown in a 100-liter fermentation vessel, and at a pH of 6.7 – 7.0, there is added 30 g. of 9β, 11β-oxido-16-methylene-4-pregnen-17α-ol-3,20-dione in 950 ml. of methanol. After 7–8 hours of agitation, the reaction is terminated. The liquor is extracted several times with dichloromethane; the combined extracts are concentrated by evaporation, and the residue is mixed with 600 ml. of petroleum ether. After allowing the reaction mixture to stand overnight, the thus-obtained 9β,11β-oxido-16-methylene-1,4-pregnadien-17α-ol-3,20-dione is vacuum-filtered, washed with petroleum ether, dried, and recrystallized from acetone; m.p. 229°–230°C.; $[\alpha]_D^{20}$ —93.2° (chloroform); yield: 78.5 percent.

b. Epoxide Cleavage With Hydrogen Fluoride

Under agitation at −20° C., 41.5 g. of 9β,11β-oxido-16-methylene-1,4-pregnadien-17α-ol-3,20-dione is introduced in small increments during the course of ½ hour into 104 ml. of 75 percent aqueous hydrofluoric acid. The reaction mixture is stirred for an additional 2 hours at −20°C., and then introduced into a mixture of 664 g. of potassium carbonate, 1 kg. of ice, and 1 kg. of water. The resultant 9α-fluoro-16-methylene-1,4-pregnadiene-11β,17α-diol-3,20-dione is vacuum-filtered, thoroughly washed with water, dried, and recrystallized from acetone; m.p. 295°–296° C.; $[\alpha]_D^{20}$ −4.5° (chloroform); yield: 78.8 percent.

c. Acetoxylation

Fifty-eight g. of 9α-fluoro-16-methylene-1,4-pregnadiene-11β,17α-diol-3,20-dione is suspended in a mixture of 870 ml. of tetrahydrofuran and 522 ml. of methanol. Under agitation and during the course of 2 hours, there are introduced 87 g. of calcium oxide and 87 g. of iodine in small portions. Thereafter, the reaction mixture is stirred for one further hour and then introduced into a mixture of 18 l. of water, 6 kg. of ice, and 290 ml. of glacial acetic acid. The precipitate is washed with water, dried at room temperature, and dissolved in 4,750 ml. of acetone. After the addition of 285 g. of potassium acetate, the reaction mixture is boiled for 6 hours, concentrated by evaporation, worked up, and recrystallized from chloroform, thus obtaining 9α-fluoro-16-methylene-prednisolone-21-acetate, m.p. 233°–234° C.; $[\alpha]_D^{20}$ +32° (dioxane); yield: 52.2 percent.

d. Saponification

One gram of 9α-fluoro-16-methylene-prednisolone-21-acetate is dissolved in 50 ml. of nitrogen-saturated methanol and mixed, with the introduction of nitrogen, with 2 ml. of 10 percent nitrogen-saturated potassium carbonate solution. The mixture is agitated for 30 minutes at room temperature, neutralized with 1.7 ml. of glacial acetic acid, diluted with water, and extracted with chloroform. After the extract has been worked up and concentrated by evaporation there is obtained 9α-fluoro-16-methylene-prednisolone, m.p. 241°–243°C. (from ethanol); $[\alpha]_D^{20}$ +26.6° (dioxane).

e. Oxidation 2.5 g. of 9α-fluoro-16-methylene-prednisolone-21-acetate is dissolved in 25 ml. of pyridine and added to a mixture of 2.5 g. of chromium trioxide and 25 ml. of pyridine. After 12 hours, the reaction mixture is poured into 250 ml. of ethyl acetate and boiled for 5 minutes. The precipitate is vacuum-filtered and thoroughly washed with hot ethyl acetate. The filtrates are washed neutral with dilute sulfuric acid, dried, and concentrated by evaporation. The residue of crude 9α-fluoro-16-methylene-prednisone-21-acetate is obtained in the pure form by recrystallization from methanol; m.p. 242°–243°C.; $[\alpha]_D^{20}$ +103.8° (dioxane).

Analogously, by oxidizing 9α-fluoro-16-methylene-prednisolone, there is obtained 9α-fluoro-16-methylene-prednisone, m.p. 241°–243°C.; $[\alpha]_D^{20}$ +86.1° (dioxane).

f. Esterification

One gram of 9α-fluoro-16-methylene-prednisolone is dissolved in 10 ml. of pyridine and mixed with 10 ml. of tert.-butyl acetyl chloride. After allowing the reaction mixture to stand for 1½ hours at room temperature, the mixture is poured into 100 ml. of water, and the thus-precipitated 9α-fluoro-16-methylene-prednisolone-21-tert.-butyl acetate is vacuum filtered, washed with water, dried, and recrystallized from acetone/ether; m.p. 231°–232°C.; $[\alpha]_D^{20}$ +20° (chloroform).

In an analogous manner, the following esters of 9α-fluoro-16-methylene-prednisolone are obtainable:

21-chloroacetate, m.p. 232°–234° C.; $[\alpha]_D^{20}$ +17° (dioxane);
21-trimethylacetate, m.p. 234°–235° C.;
21-diethylaminoacetate, m.p. 216°–217°C.; $[\alpha]_D^{20}$ +26.6° (dioxane);
21-enanthate, m.p. 231°–232°C.; $[\alpha]_D^{20}$ +4.5° (chloroform).

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

The individual reaction steps of the present process (microbiological dehydrogenation in the 1(2) position, formation of the 9α-fluoro-11β-hydroxy steroid from the 9β,11β-epoxide, introduction of the 21-acetoxy group) are well known in steroid chemistry. Reference is made to L.F. Fieser and M. Fieser, Steroids, Reinhold Publishing Corporation, New York, and Chapman & Hall Ltd., London (1959), particularly to pages 686, 683 and 625 of this book, and to the literature cited therein.

What is claimed is:

1. In a process for the production of a compound of the formula:

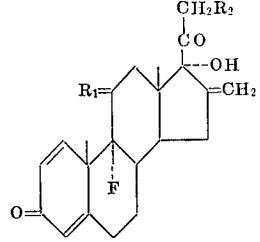

wherein
R₁ represents αH, βOH or =O, and
R₂ represents a free or esterified hydroxy group, the improvement comprising conducting the following steps in successive order:
 a. microbiologically dehydrogenating 9β,11β-oxido-16-methylene-4-pregnene-17α-ol-3,20-dione in the 1(2) position;
 b. reacting the resultant 9β,11β-oxido-16-methylene-1,4-pregnadiene-17α-ol-3,20-dione with hydrogen fluoride; and
 c. subjecting the resultant 9α-fluoro-16-methylene-1,4-pregnadiene-11β,17α-diol-3,20-dione to an acetoxylation step to convert 21-hydrogen atom to a 21-acetoxy group.

2. A process as defined by claim 1 further comprising the step of oxidizing the 11-OH group of said 9α-fluoro-16-methyleneprednisolone-21-acetate to form 9α-fluoro-16-methyleneprednisone-21-acetate.

3. A process as defined by claim 1 comprising the further step of saponifying the 21-acetoxy group to liberate the 21-OH group.

4. A process as defined by claim 2 comprising the further step of saponifying the 21-acetoxy group to liberate the 21-OH group.

5. A process as defined by claim 3 comprising the further step of esterifying the 21-OH group.

6. A process as defined by claim 4 comprising the further step of esterifying the 21-OH group.

7. A process as defined by claim 1 wherein step (c) is conducted by reacting the resultant 9α-fluoro-16-methylene-1,4-pregnadiene-11β,17α-diol-3,20-dione with iodine in an alkaline solution, and thereafter with an alkali metal acetate to form 9α-fluoro-16-methylene-prednisolone-21-acetate.

* * * * *